US009625156B2

(12) United States Patent
Rudrapatna et al.

(10) Patent No.: US 9,625,156 B2
(45) Date of Patent: Apr. 18, 2017

(54) GAS TURBINE ENGINES HAVING FUEL INJECTOR SHROUDS WITH INTERIOR RIBS

(71) Applicant: HONEYWELL INTERNATIONAL INC., Morristown, NJ (US)

(72) Inventors: Nagaraja S. Rudrapatna, Chandler, AZ (US); Thomas J. Bronson, Mesa, AZ (US); Donald G. Godfrey, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 635 days.

(21) Appl. No.: 14/067,377

(22) Filed: Oct. 30, 2013

(65) Prior Publication Data
US 2015/0113993 A1 Apr. 30, 2015

(51) Int. Cl.
*F23R 3/30* (2006.01)
*F23R 3/28* (2006.01)
(Continued)

(52) U.S. Cl.
CPC ............ *F23R 3/286* (2013.01); *B22F 3/1055* (2013.01); *B22F 5/009* (2013.01); *B23K 26/342* (2015.10); *F23R 3/14* (2013.01); *F23R 3/283* (2013.01); *F23R 3/54* (2013.01); *B33Y 10/00* (2014.12); *B33Y 80/00* (2014.12); *F23R 2900/00018* (2013.01); *Y02T 50/675* (2013.01)

(58) Field of Classification Search
CPC ...... F23R 3/12; F23R 3/14; F23R 3/16; F23R 3/54; F23R 3/283; F23R 3/286; Y02T 50/675
See application file for complete search history.

(56) References Cited

U.S. PATENT DOCUMENTS

| 4,082,499 A * | 4/1978 | Rossi | F27B 7/34 |
| | | | 431/160 |
| 7,624,576 B2 * | 12/2009 | Alkabie | F02C 7/22 |
| | | | 239/399 |

(Continued)

FOREIGN PATENT DOCUMENTS

WO 9428351 A1 12/1994

OTHER PUBLICATIONS

EP Extended Search Report for Application No. 14187575.7 dated Mar. 11, 2015.

*Primary Examiner* — Gerald L Sung
*Assistant Examiner* — Marc Amar
(74) *Attorney, Agent, or Firm* — Lorenz & Kopf, LLP

(57) ABSTRACT

A fuel injector assembly includes a fuel injector and a fuel injector shroud housing the fuel injector. The fuel injector includes a body and a nozzle coupled to the body. The fuel injector shroud includes a swirler device defining a center opening proximate to the nozzle of the fuel injector and a plurality of swirler holes surrounding the center opening, a body section with an air inlet configured to admit a flow of air into the fuel injector shroud and a dome section defining a mount for securing the swirler device to the body section, and at least one interior rib positioned on an interior surface of the dome section configured to direct the flow of air to the swirler holes of the swirler device such that the flow of air exiting through the swirler is mixed with the flow of fuel exiting the nozzle.

17 Claims, 9 Drawing Sheets

(51) Int. Cl.
  *B22F 3/105* (2006.01)
  *B22F 5/00* (2006.01)
  *F23R 3/14* (2006.01)
  *F23R 3/54* (2006.01)
  *B23K 26/342* (2014.01)
  *B33Y 10/00* (2015.01)
  *B33Y 80/00* (2015.01)

(56) References Cited

U.S. PATENT DOCUMENTS

| | | | |
|---|---|---|---|
| 8,161,751 B2 | 4/2012 | Hall | |
| 8,196,845 B2* | 6/2012 | Thomson | F23D 11/107 |
| | | | 239/132 |
| 2007/0012042 A1 | 1/2007 | Alkabie | |
| 2007/0193272 A1* | 8/2007 | Hebert | F23D 11/107 |
| | | | 60/740 |
| 2009/0255256 A1 | 10/2009 | McMasters et al. | |
| 2013/0305726 A1* | 11/2013 | Carrere | F23D 11/103 |
| | | | 60/746 |
| 2014/0352323 A1* | 12/2014 | Bennett | F02C 7/28 |
| | | | 60/799 |

* cited by examiner

GAS TURBINE ENGINES HAVING FUEL INJECTOR SHROUDS WITH INTERIOR RIBS

TECHNICAL FIELD

The present invention generally relates to gas turbine engines, and more particularly relates to gas turbine engines with improved fuel injector shrouds.

BACKGROUND

A gas turbine engine may be used to power aircraft or various other types of vehicles and systems. Such engines typically include a compressor that receives and compresses incoming gas such as air; a combustor in which the compressed gas is mixed with fuel and burned to produce high-pressure, high-velocity exhaust gas; and one or more turbines that extract energy from the exhaust gas exiting the combustor.

There is an increasing desire to reduce gaseous pollutant emissions, particularly oxides of nitrogen (NOx), that form during the combustion process. One approach to reduce NOx emissions is the implementation of a rich burn, quick quench, lean burn (RQL) combustion concept. A combustor configured for RQL combustion includes three serially arranged combustion zones: a rich burn zone at the forward end of the combustor, a quench zone downstream of the rich burn zone, and a lean burn zone downstream of the quench zone. By precisely controlling the stoichiometry between the air and fuel in each of these zones, NOx emissions can be minimized.

In addition to reducing emissions, combustor designers further attempt to manage the temperature characteristics of the combustion process, which is particularly difficult in an RQL combustor. High temperatures may cause thermal stresses and other problems. While increased cooling flows may improve cooling, such additional air flow may interfere with the stoichiometries of the RQL combustion process. One such component that may be susceptible to high temperature issues is the fuel injector shroud that surrounds a fuel injector within the combustion chamber. During operation the fuel injector shroud directs air to the nozzle of the fuel injector for mixing prior to combustion. Improvements with respect to the durability and air flow conditioning characteristics of such fuel injector shrouds are desirable.

Accordingly, it is desirable to provide gas turbine engines with improved fuel injector shrouds. In addition, it is desirable to provide fuel injector shrouds with improved air flow and durability characteristics. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a fuel injector assembly includes a fuel injector and a fuel injector shroud housing the fuel injector. The fuel injector includes a body and a nozzle coupled to the body, the body configured to deliver a flow of fuel to the nozzle. The fuel injector shroud includes a swirler device defining a center opening proximate to the nozzle of the fuel injector and a plurality of swirler holes surrounding the center opening, a body section with an air inlet configured to admit a flow of air into the fuel injector shroud and a dome section defining a mount for securing the swirler device to the body section, and at least one interior rib positioned on an interior surface of the dome section configured to direct the flow of air to the swirler holes of the swirler device such that the flow of air exiting through the swirler is mixed with the flow of fuel exiting the nozzle.

In accordance with another exemplary embodiment, a fuel injector shroud for a fuel injector assembly includes a swirler device defining a center opening and a plurality of swirler holes surrounding the center opening; a body section comprising an air inlet configured to admit a flow of air into the fuel injector shroud and a dome section defining a mount for securing the swirler device to the body section; and at least one interior rib positioned on an interior surface of the dome section configured to direct the flow of air to the swirler holes of the swirler device.

In accordance with another exemplary embodiment, a method is provided for manufacturing a fuel injector shroud. The method includes defining a design model of the fuel injector shroud; and using additive manufacturing to form the fuel injector shroud as a unitary piece, including forming an interior rib on an interior surface of a dome section of the fuel injector shroud.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
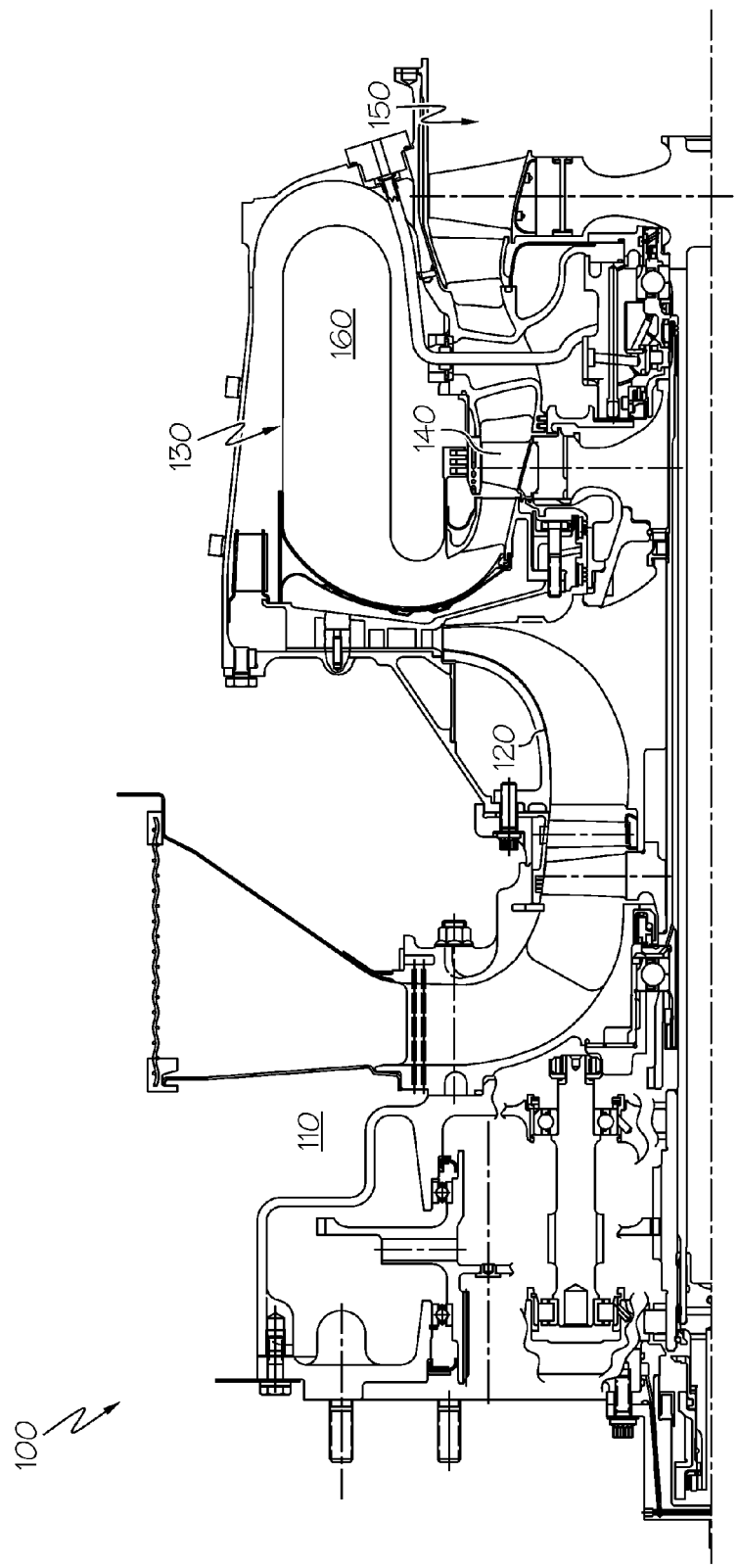
FIG. 1 is a cross-sectional view of a gas turbine engine in accordance with an exemplary embodiment.

FIG. 1 is a cross-sectional view of an engine 100 in accordance with an exemplary embodiment. In one embodiment, the engine 100 is a multi-spool gas turbine main propulsion engine. The engine 100 includes an intake section 110, a compressor section 120, a combustion section 130, a turbine section 140, and an exhaust section 150

The intake section 110 receives air drawn into the engine 100 and directs the air into the compressor section 120. The compressor section 120 may include one or more compressors that raise the pressure of the air and direct the compressed air into the combustion section 130. In the depicted embodiment, a two-stage compressor is shown, although it will be appreciated that one or more additional compressors could be used The combustion section 130, which is discussed in greater detail below, includes a combustor 160 that mixes the compressed air with fuel and ignites the resulting mixture to generate high energy combustion gases that are then directed into the turbine section 140. In one embodiment, the combustor 160 is implemented as a reverse flow combustor unit, although other embodiments may include a different type of combustor. The turbine section 140 includes one or more turbines in which the combustion gases from the combustion section 130 expand and rotate the turbines. The combustion gases are then exhausted through the exhaust section 150.

Figure 2:
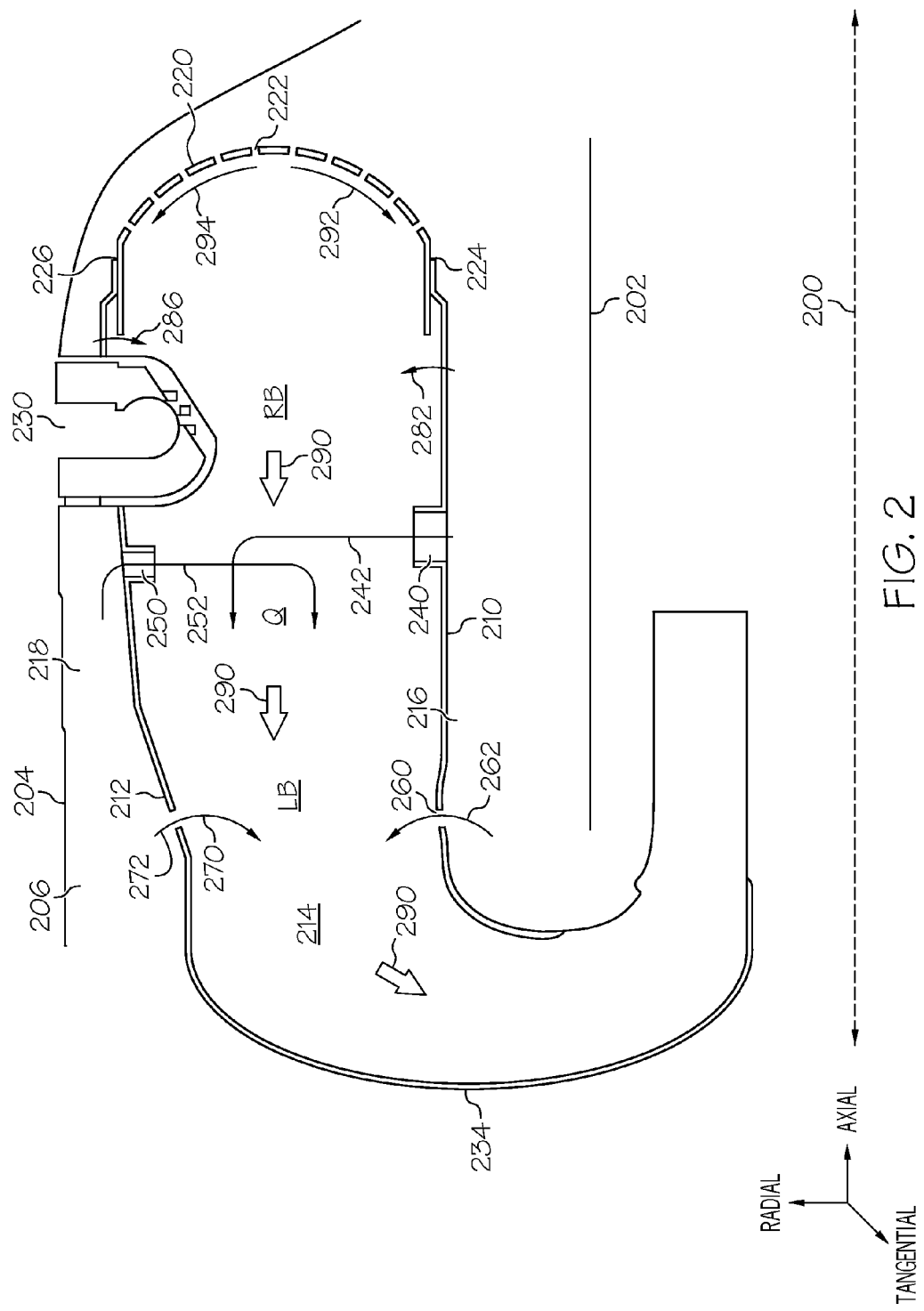
FIG. 2 is a more detailed cross-sectional view of a combustor of the engine of FIG. 1 in accordance with an exemplary embodiment.

FIG. 2 is a more detailed cross-sectional view of a portion of the engine 100 of FIG. 1, and particularly illustrates the combustion section 130 of FIG. 1. In FIG. 2, only half the cross-sectional view is shown; the other half being substantially rotationally symmetric about a centerline and axis of rotation 200. In certain embodiments, the combustor 160 may be an annular rich burn, quick quench, lean burn (RQL) reverse-flow gas turbine engine combustor, as will now be described in more detail. In other embodiments, the combustor 160 may be another type of combustor.

The combustor 160 includes a radially inner case 202 and a radially outer case 204 concentrically arranged with respect to the inner case 202. The inner and outer cases 202, 204 circumscribe the centerline 200 to define an annular pressure vessel 206. The combustor 160 is arranged within the annular pressure vessel 206. Particularly, the combustor 160 includes an inner liner 210 and an outer liner 212 circumscribing the inner liner 210. The liners 210, 212 and cases 202, 204 define respective inner and outer air plenums 216, 218.

As described in further detail below, the combustor 160 further includes a combustor dome 220 respectively coupled to inner and outer liners 210, 212 at a first (or inner) edge 224 and a second (or outer) edge 226. The inner liner 210, the outer liner 212, and the combustor dome 220 cooperate to form a combustion chamber 214 therebetween. The combustor 160 further includes a series of fuel injector assemblies 230 (one of which is shown) coupled to the outer liner 212. Quench air admission holes 240, 250 respectively formed in the inner and outer liners 210, 212, and dilution air admission holes 260, 270 also respectively formed in the inner and outer liners 210, 212.

During operation, a portion of the pressurized air from the compressor section 120 (FIG. 1) enters a rich burn zone RB of the combustion chamber 214 in the inner and outer liners 210, 212. The pressurized air entering the rich burn zone RB is schematically shown in FIG. 2 as air flow 282, 286. As described in further detail below, the fuel injector assemblies 230 are arranged to supply fuel to the rich burn zone RB in a compound angular direction, which includes a radially inward direction toward the centerline 200, an axial direction toward the combustor dome 220, and a tangential direction about the circumference of the combustion chamber 214 to result in improved mixing of the fuel with the primary air jets 282, 286. The air flow 282, 286 intermixes with a stoichiometrically excessive quantity of fuel introduced through the fuel injector assemblies 230 to support initial combustion in the rich burn zone RB. The rich stoichiometry of the fuel-air mixture in the rich burn zone RB produces a relatively cool, oxygen-deprived flame, thus preventing excessive NOx formation and guarding against blowout of the combustion flame during any abrupt reduction in engine power.

The combustor dome 220 may include a number of effusion holes 222 to permit compressed air to pass therethrough as a cooling flow on the interior surface of the combustor dome 220, which functions as a buffering layer to reduce the direct contact of the hot combustion gases 290 with interior surface of the combustor dome 220 as well as convectively cooling the wall of the combustor dome 220.

The combustion gases 290 from the rich burn zone RB, which include unburned fuel, enter a quench zone Q. Quench jets 242, 252 flow from the plenums 216, 218 and into the quench zone Q through the quench air admission holes 240, 250 in the inner and outer liners 210, 212, respectively to rapidly mix the combustion gases 290 from a stoichiometrically rich state at the forward edge of the quench zone Q to a stoichiometrically lean state at, or just downstream of, the aft edge of the quench zone Q. This supports further combustion and releases additional energy from the fuel. Since thermal NOx formation is a strong time-at-temperature phenomenon, it is important that the fuel-rich mixture passing through the quench zone Q be mixed rapidly and thoroughly to a fuel-lean state in order to avoid excessive NOx generation.

Finally, the combustion products from the quench zone Q enter a lean burn zone LB where the combustion process concludes. As the combustion gases 290 flow into the lean burn zone LB, the quench jets 242, 252 are swept downstream and also continue to penetrate radially and spread out laterally to intermix thoroughly with the combustion gases 290. Additionally, dilution jets 262, 272 flow from the plenums 216, 218 through dilution air admission holes 260, 270 respectively formed in the inner and outer liners 210, 212 to result in a stoichiometrically lean quantity of fuel in the lean burn zone LB. The dilution air admission holes 260, 270 additionally function to provide a desired temperature distribution and to complete the combustion process such that smoke and NOx emissions are reduced. Although an RQL combustor is described above, exemplary embodiments discussed below may be incorporated into any type of combustor.

Figure 3:
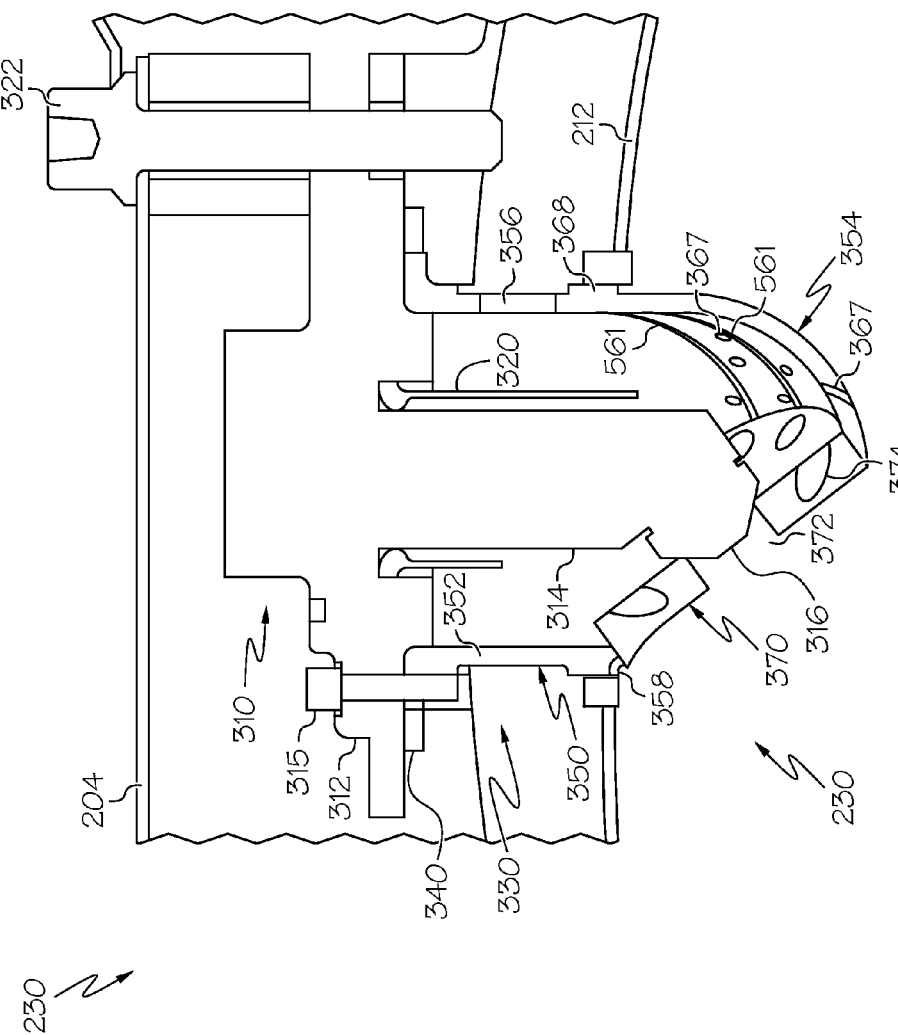
FIG. 3 is a cross-sectional view of a fuel injector assembly of the combustor of FIG. 2 in accordance with an exemplary embodiment.

FIG. 3 is a cross-sectional view of a fuel injector assembly (e.g., fuel injector assembly 230 of the combustor 160 of FIG. 2) in accordance with an exemplary embodiment. A number of fuel injector assemblies 230 may be angularly spaced about the annular combustor 160 of FIG. 2. The fuel injector assembly 230 includes a fuel injector 310 and a fuel injector shroud 330. The fuel injector 310 and fuel injector shroud 330 may be mounted in any suitable configuration and arrangement such that the fuel injector assembly 230 provides the desired fuel-air mixture to the combustion chamber 214. Although not shown, a ring or boss structure may be provided to couple the fuel injector 310 and/or the fuel injector shroud 330 the case 204 of the combustor 160, e.g., with a bolt of other mounting arrangement.

The fuel injector 310 extends from the case 204 through an opening in combustion liner 212. As described in greater detail below, the fuel injector 310 includes a body 314 with a nozzle 316. The fuel injector 310 is configured to receive a flow of fuel from a manifold and/or fuel source (not shown) and the body 314 defines a passageway to direct the fuel to the nozzle 316. The nozzle 316 delivers fuel to the combustion chamber 214, which is mixed with air delivered by the fuel injector shroud 330.

As shown, the body 314 of the fuel injector 310 extends in a generally radial direction, and the nozzle 316 is oriented at an angle to the body 314. In one exemplary embodiment, the fuel injector 310 may include a flange 312 to provide a mounting arrangement. A cylindrical heat shield 320 may be provided to at least partially shield the body 314 and/or nozzle 316. In the depicted exemplary embodiment, the nozzle 316 is oriented in a partially axial or upstream direction toward the combustor dome 220 (FIG. 2) such that the fuel is delivered at a compound angle, e.g., a partially axial and partially radial direction, as well as a tangential or circumferential direction, as desired. The nozzle 316 may be oriented in any suitable direction. Proper delivery of the fuel may promote blending and burn uniformity within rich burn zone RB of the combustion chamber 214, which may enhance the cooling characteristics, the NOx emissions characteristics, and the temperature distributions of the combustion gases entering the turbine section 140 (FIG. 1).

The fuel injector shroud 330 generally includes a mounting flange 340, a body portion 350, and a swirler device 370. The mounting flange 340 generally extends in an axial-circumferential plane, perpendicular to a radial direction. Typically, the mounting flange 340 extends from the body portion 350 and mounts the fuel injector shroud 330 to the fuel injector 310. As shown in FIG. 3, in one exemplary embodiment, the mounting flange 340 of the fuel injector shroud 330 and the flange 312 of the fuel injector 310 have corresponding holes for respectively receiving a screw or bolt 315 to secure the fuel injector assembly 230 together. In other embodiments, different mounting arrangements may be provided. For example, the fuel injector shroud 330 may be press-fit or snap-fit into a matching structure on the fuel injector 310.

The body portion 350 of the fuel injector shroud 330 is generally cylindrical to house the fuel injector 310. In one exemplary embodiment, the body portion 350 includes a cylindrical section 352 extending from the mounting flange 340 and a dome section 354 extending from the cylindrical section 352. The cylindrical section 352 defines an air inlet 356 for admitting air into the fuel injector shroud 330 and the fuel injector assembly 230. In one exemplary embodiment, the air inlet 356 is oval shaped, although any suitable shape may be provided. Additional details about the air inlet 356 will be provided below.

The dome section 354 at least partially houses the nozzle 316 of the fuel injector 310 and defines a swirler mount 358 oriented in the direction of the nozzle 316. As described in greater detail below, the swirler mount 358 is generally circular and receives the swirler device 370. In some embodiments, the dome section 354 only partially defines the swirler mount 358 such that the remaining portion of the swirler mount 358 is formed by the cylindrical section.

The dome section 354 and/or cylindrical section 352 may include one or more interior ribs 560, 561 arranged on the interior surfaces. Two interior ribs 560, 561 are shown in FIG. 3, although as discussed below, additional interior ribs may be provided. In general, the interior ribs 560, 561 may be sized and arranged to direct air as necessary or desired in a predictable manner to the swirler device 370. Additional details about the interior ribs 560, 561 will be provided below.

The dome section 354 may include one or more cooling holes 367. In general, the cooling holes 367 may be effusion cooling holes that permit a portion of the air flowing through the fuel injector shroud 330 to pass through to the exterior surface of the dome section 354. Such cooling air forms a layer of cooling air to shield the dome section 354 from combustion gases. The cooling holes 367 may additionally provide some convective cooling as the cooling air passes through the of the dome section 354. Typically, the cooling holes 367 are generally 0.01 to 0.04 inches in diameter, although the diameter may vary with application and may depend on factors such as the dimensions of the dome section 354, the temperature of the combustion gases, and the velocity of the cooling flow. Individual hole shape is generally cylindrical or oval, with minor deviations due to manufacturing method, e.g., edge rounding, tapers, out-of-round, oblong, or the like, although non-cylindrical shapes may be provided. The cooling holes 367 may be uniformly spaced and/or patterned to provide desired cooling characteristics. Additional aspects of the cooling holes 367 will be discussed below.

As shown, the cylindrical section 352 includes an outer mounting ring 368 extending around the periphery of the cylindrical section 352. The outer mounting ring 368 may be coupled to the combustor liner 212 to position a portion of the fuel injector assembly in the combustion chamber 214. In particular, the dome section 354 extends into the combustion chamber 214 and functions to at least partially shield the fuel injector 310 from combustion gases within the combustion chamber 214.

The swirler device 370 is mounted within the swirler mount 358 in the body portion 350. Generally, the swirler device 370 is disk-shaped with a center opening 372 for accommodating the nozzle 316 of the fuel injector 310 adjacent to or within the center opening 372 such that fuel may be delivered through the center opening 372, out of the nozzle 316, and out of the fuel injector assembly 230. One or more swirler holes 374 are arranged around the center opening 372 to deliver air at or proximate to the nozzle 316. The swirler holes 374 may be oriented as necessary or desired to swirl the air flowing therethrough, e.g., in axial, radial, and tangential directions and at angles to the surface of the swirler device 370 to thereby impart a swirling motion. As described below, the swirler device 370, including the center opening 372 and swirler holes 374, may be integrally formed with the other components of the fuel injector shroud 330. Additional details about the fuel injector shroud 330 will be provided below.

As such, during operation, air enters the fuel injector assembly 230 at the air inlet 356, flows through the body portion 350, and flows through the swirler holes 374 of the swirler device 370. Upon flowing out of the swirler device 370, the air is conditioned to mix with the fuel to provide the desired air-fuel characteristics. In general, all or a substantial amount of the fuel and air mixing occurs outside of the fuel injector shroud 330, e.g. just downstream or immediately adjacent to the swirler device 370.

Figure 4:
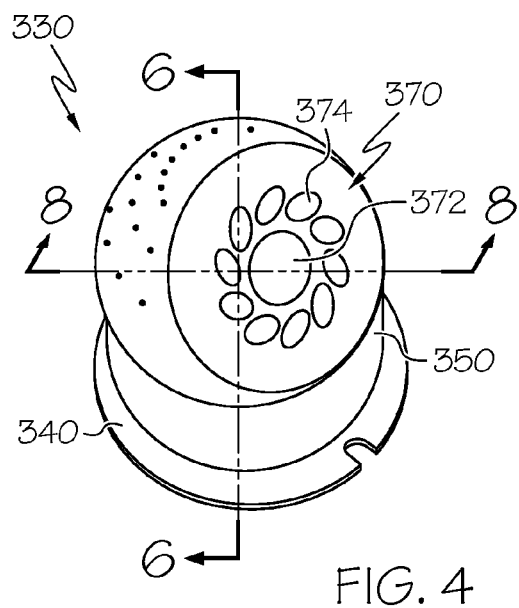
FIG. 4 is a first isometric exterior view of a fuel injector shroud of the fuel injector assembly of FIG. 3 in accordance with an exemplary embodiment.
Figure 5:
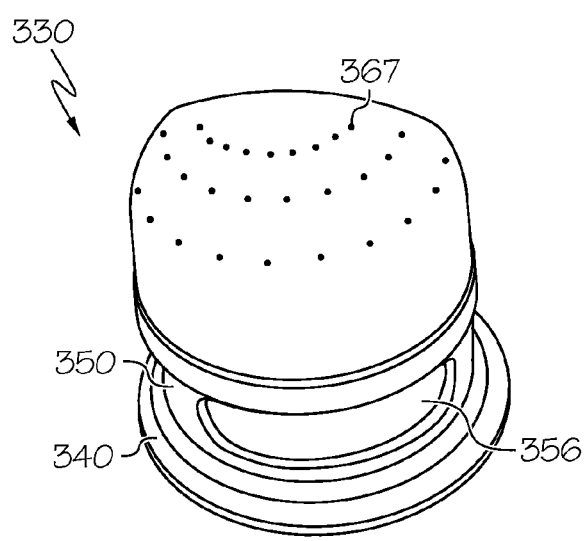
FIG. 5 is a second isometric exterior view of the fuel injector shroud of the fuel injector assembly of FIG. 3 in accordance with an exemplary embodiment.

Additional details about the fuel injector shroud 330 will be provided with reference to FIGS. 4-8, which depict various views of the fuel injector shroud 330 removed from the fuel injector assembly 230 of FIG. 3. For example, FIG. 4 is a first isometric exterior view of a fuel injector shroud 330, and FIG. 5 is a second isometric exterior view of the fuel injector shroud 330. FIGS. 4 and 5 particularly depict the mounting flange 340, the body portion 350, and the swirler device 370. FIG. 4 more clearly shows the arrangement of swirler holes 374 relative to the center opening 372 in the swirler device 370. FIG. 5 more clearly shows the air inlet 356 and the cooling holes 367 defined in the body portion 350.

Figure 6:
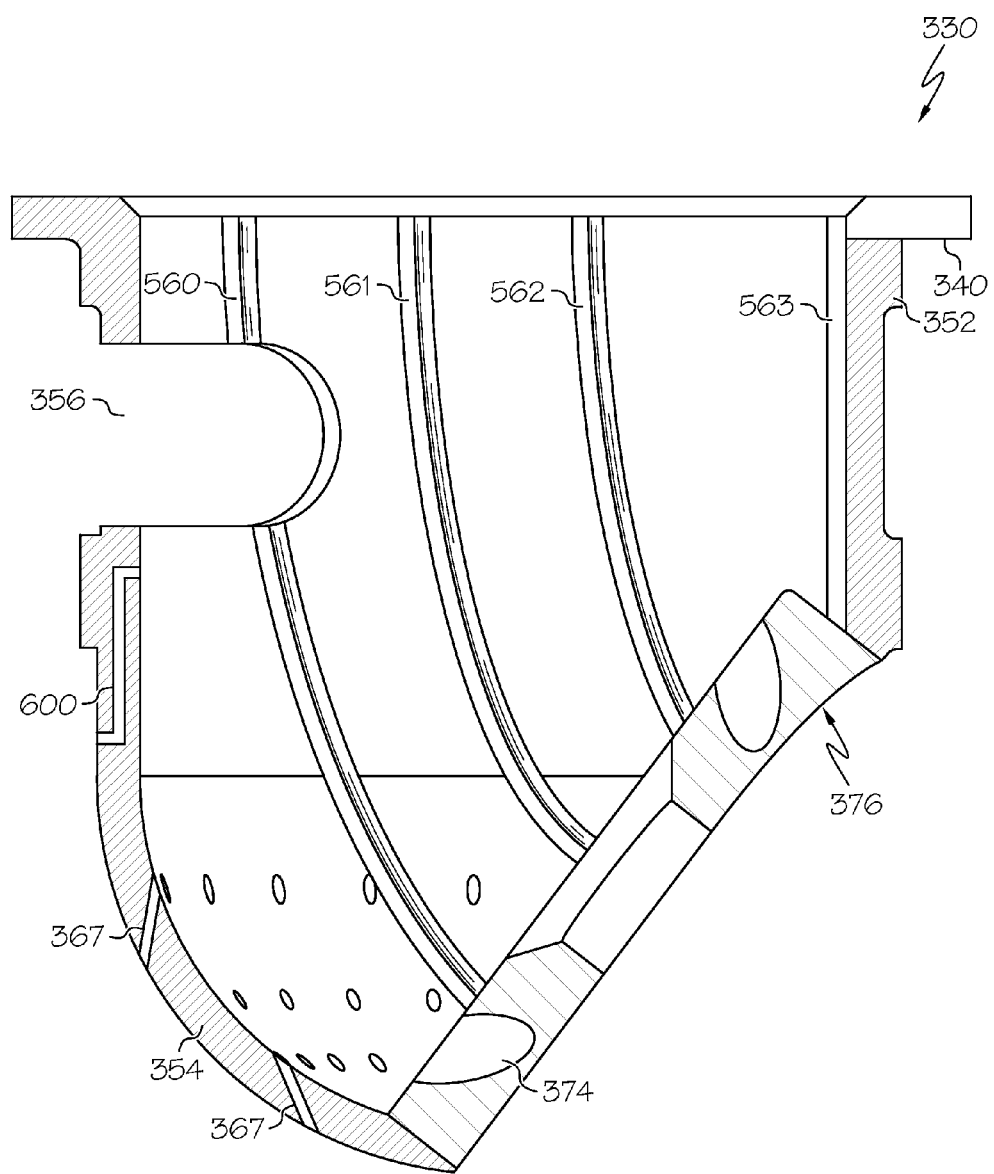
FIG. 6 is a cross-sectional view of the fuel injector shroud of FIG. 4 through line 6-6 in accordance with an exemplary embodiment.
Figure 7:
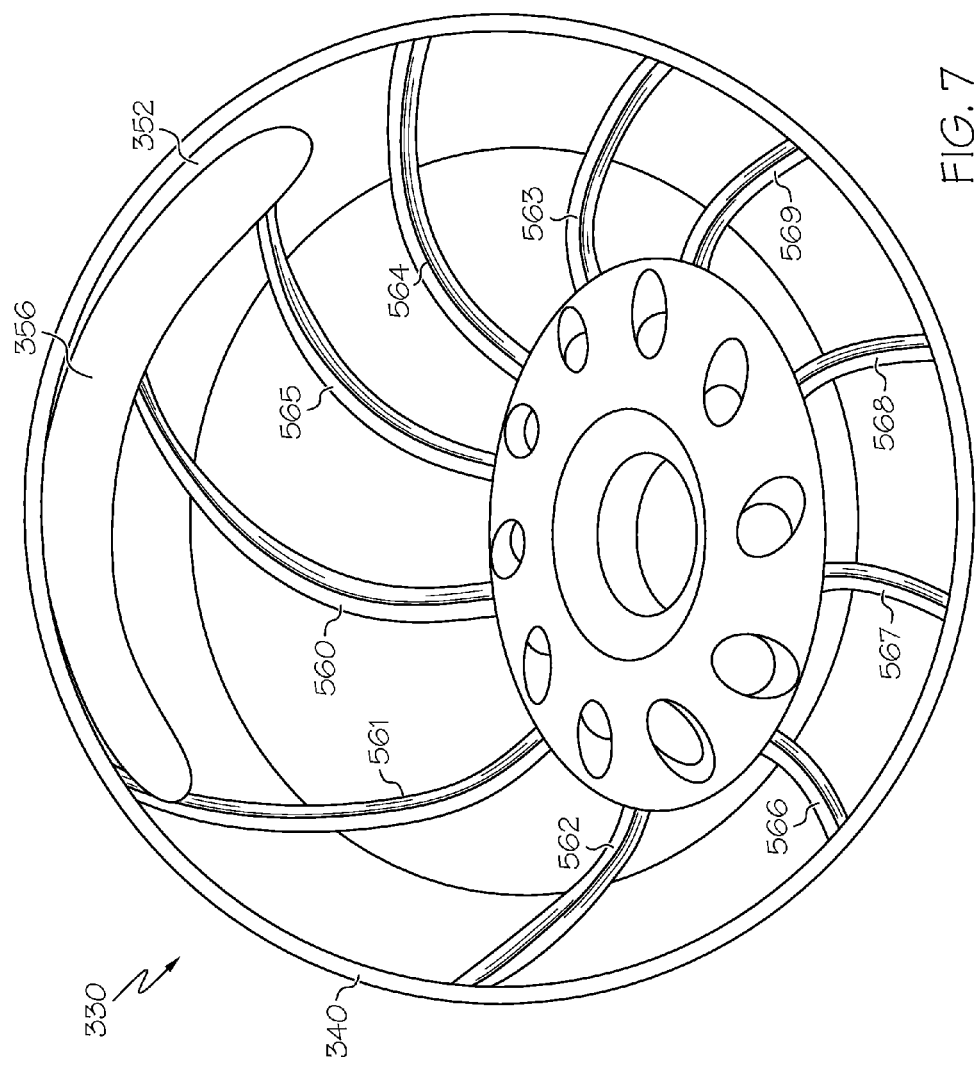
FIG. 7 is a first isometric interior view of the fuel injector shroud of FIGS. 4 and 5 in accordance with an exemplary embodiment.
Figure 8:
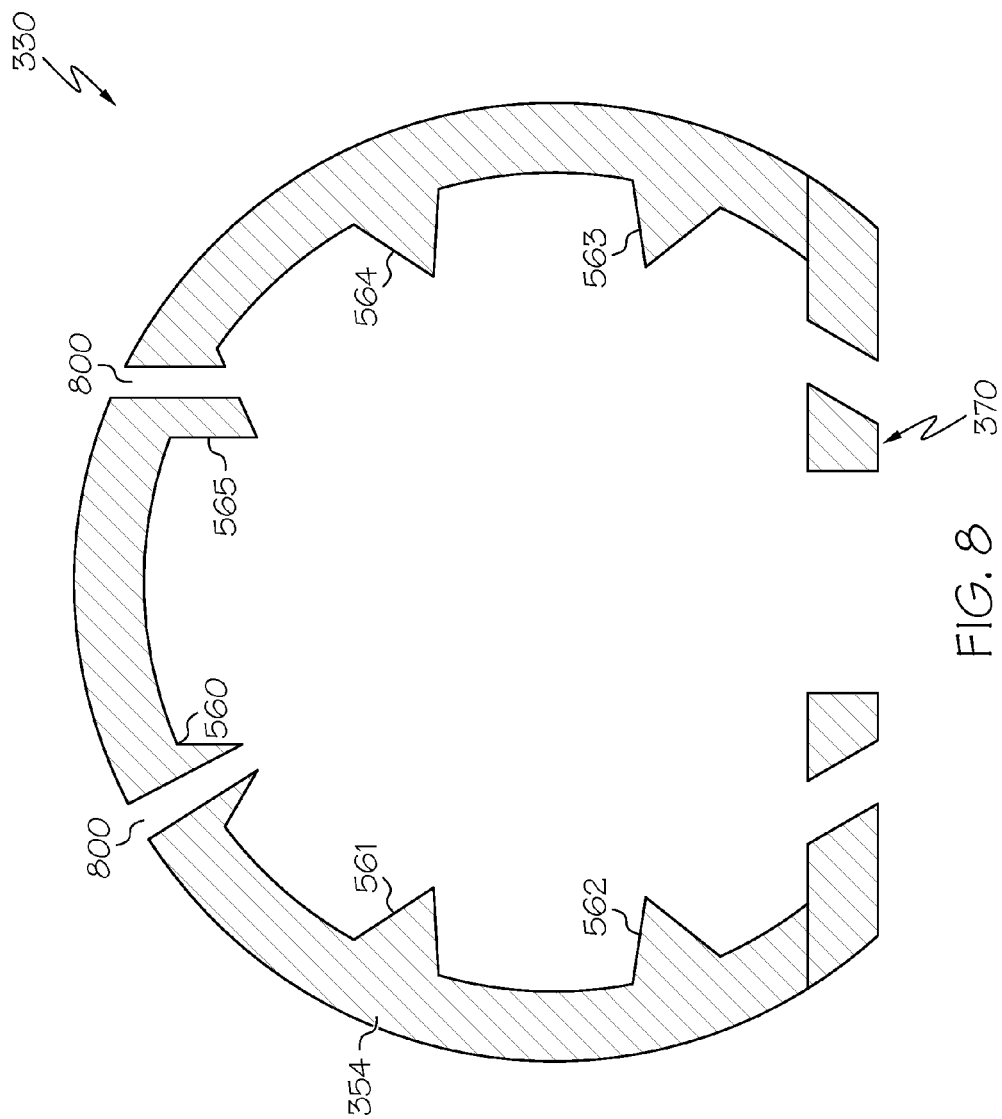
FIG. 8 is a cross-sectional view of the fuel injector shroud of FIG. 4 through line 8-8 in accordance with an exemplary embodiment.

Additional details of the interior ribs (e.g., interior ribs 560-569) will now be described with reference to FIGS. 6-8. FIG. 6 is a cross-sectional view of the fuel injector shroud 330 of FIG. 4 through line 6-6 in accordance with an exemplary embodiment. FIG. 7 is a first isometric interior view of the fuel injector shroud 330 of FIGS. 4 and 5 in accordance with an exemplary embodiment. FIG. 7 is particularly a view into the interior of the fuel injector shroud 330, through the opening defined by the mounting flange 340. FIG. 8 is a cross-sectional view of the fuel injector shroud of FIG. 4 through line 8-8 in accordance with an exemplary embodiment.

As best shown by FIGS. 5 and 6, the air inlet 356 is generally oval and positioned on the cylindrical section 352. In general, the air inlet 356 may have any suitable length, shape, size, or position to admit the desired amount of air into the fuel injector shroud 330. In this exemplary embodiment, the air inlet 356 is positioned on the side of the cylindrical section on a side opposite to the swirler device 370 in an axial direction. The air flowing through the air inlet 356 enters the fuel injector shroud 330 in a generally axial direction and, as described below, is redirected towards the swirler device 370.

FIGS. 6-8 particularly depict one exemplary arrangement of the interior ribs 560-569. The view of FIG. 6 depicts three interior ribs 560, 561, 562, while the view of FIGS. 7 and 8 depict ten interior ribs 560, 561, 562, 563, 564, 565, 566, 567, 568, 569.

The interior ribs 560-569 may have any suitable shape, arrangement and number. The interior ribs 560-569 may be considered louvers or baffles. In general and as noted above, the interior ribs 560-569 are configured to direct air in an advantageous manner to the swirler device 370. For example, the interior ribs 560-569 may direct air to the individual swirler holes 374 of the swirler device 370, thereby providing a more direct aerodynamic coupling between the air inlet 356 and the swirler holes 374. In one exemplary embodiment, the interior ribs 560-569 from a first end, on the cylindrical section 352, along the concave length of the dome section 354 generally in the direction of air flow, to a second end, proximate to the swirler device 370. In the depicted exemplary embodiment, the ribs 560-569 extend from the edge or end of the cylindrical section 352, proximate to the mounting flange 340. In other embodiments, the ribs 560-569 may extend from a radial position generally corresponding to the inlet 356, e.g. the inner radial edge of the inlet 356. As such, the ribs 560-569 may be provided on the cylindrical section 352, the dome section 354, and/or a combination of the cylindrical section 352 and dome section 354, as necessary or desired to achieve advantageous airflow to the swirler device 370.

The interior ribs 560-569 may have the same or different lengths and heights. In one exemplary embodiment, the interior ribs 560-569 may have heights, for example, of about 0.0100 inches to about 0.250 inches, although other heights may be provided. As best shown in FIG. 7, the second end of each interior rib 560-569 may be positioned between adjacent swirler holes 374. As such, adjacent interior ribs 560-569 may form a channel to more efficiently direct air into an individual swirler hole 374. In some embodiments, the interior ribs 560-569 may provide additional surface area to improve heat transfer characteristics, e.g., to improve thermal management of the shroud 330.

As also best shown in FIG. 7, the interior ribs 560-569 may have a longitudinal shape that is aerodynamic and/or curved such that air may be directed in the most desired manner. As best shown in FIG. 8, the interior ribs 560-569 may have a triangular cross-sectional shape, although any shape may be provided, included rounded, frustum, conical and/or squared.

As such, the interior ribs 560-569 may function to provide a number of advantages. For example, the interior ribs 560-569 may reduce flow losses through the fuel injector shroud 330. Additionally, the interior ribs 560-569 may function to more evenly distribute the air flow to the swirler device 370. For example, the air enters the fuel injector shroud 330 through in the air inlet 356 on an opposite side of the fuel injector shroud 330 from the swirler device 370, and the swirler device 370 is angled relative to the air inlet 356. As a result of this arrangement, some of the swirler holes 374 may be closer, or otherwise a more direct route, than the other swirler holes 374 from the air inlet 356, which may otherwise result in an uneven distribution of air through the swirler holes 374 around the circumference of the swirler hole arrangement. For example, interior ribs 560-569 may be arranged such that the air flow through each swirler hole 374 is approximately equal in flow rate, volume and/or velocity. The distribution may be managed based on any characteristic of the interior ribs 560-569, including number, height, shape, length, arrangement, position, and the like. These resulting channels formed by interior ribs 560-569 enable non-circular, vane-style flow passages that may result in improved combustor performance and emissions. In some exemplary embodiments, the interior ribs 560-569 may be modified or augmented by a series of pins. Such pins may be sized and/or arranged to similarly direct a desired distribution of air flow to the swirler device 370, as well as provide additional surface area to improve heat transfer characteristics. Additionally, in some exemplary embodiments, the interior ribs 560-569 may be designed to suitably swirl the air along the interior surface of the fuel injector shroud 330. In such embodiments, the swirler device 370 may be omitted.

As noted above, the dome section 354 may have one or more cooling holes 367 that direct a portion of the air flowing through the fuel injector shroud 330 to pass through to the exterior surface of the dome section 354. Referring now to FIG. 6, the cooling holes 367 may be considered a first type of cooling hole that generally extends from an interior surface of the dome section 354, straight to the exterior surface of the dome section 354, typically at an angle to these surfaces. As also shown in FIG. 6, the dome section 354 may have other types of cooling holes. For example, the dome section 354 may include one or more effusion cooling holes 600 formed by one or more segments extending at angles to one another. In the exemplary embodiment of FIG. 6, the cooling hole 600 includes a first segment extending from the interior surface of the dome section 354, generally perpendicular to the interior surface, a second segment extending from the first segment at an angle, and a third segment extending from the second segment at an angle to the exterior surface of the dome section. 354. In general, the cooling holes, such as cooling hole 600, are not necessarily straight cooling holes and may extend along portions of the wall of the dome section 354 such that air may be taken from desired portions of the interior surface of the dome section 354 and delivered to desired portions of the exterior surface of the dome section 354, e.g., to improve the resulting layer of effusion cooling on the exterior surface. Additionally, the cooling hole 600, considering the extended length to diameter ratio, may provide convective and conductive cooling to the dome section 354.

Now referring to FIG. 8, an additional type of cooling hole 800 may be provided through the dome section 354. In particular, the dome section 354 may include cooling holes 800 that extend through the interior ribs 560-569. For example, as shown in FIG. 8, a cooling hole 800 extends through interior rib 560, through the wall of the dome section 354, and to the exterior surface of the dome section 354, and a cooling hole 800 extends through interior rib 565, through the wall of the dome section 354, and to the exterior surface of the dome surface 354. In general, the cooling holes 800 may have any orientation through the cooling ribs 560-569. As examples, the cooling hole 800 through the interior rib 560 extends through the apex of the interior rib 560, generally through the center of the interior rib 560, and the cooling hole 800 extends at an angle through the interior rib 565. As in the cooling holes 367 discussed above, the cooling holes 800 may be effusion cooling holes that provide a layer of cooling air on the exterior surface of the dome section 354 to shield the dome section 354 from the combustion gases. Additionally, the cooling hole 800, considering the extended length to diameter ratio, may provide convective and conductive cooling to the dome section 354. In general, the cooling holes (e.g., cooling holes 600, 800) described above may minimize the amount of cooling air required and/or allow the usage of larger effusion hole diameters, thereby mitigating or eliminating potential blockages. In some embodiments, the cooling hole (e.g., cooling holes 600, 800) may provide additional surface area to improve heat transfer characteristics.

Figure 9:
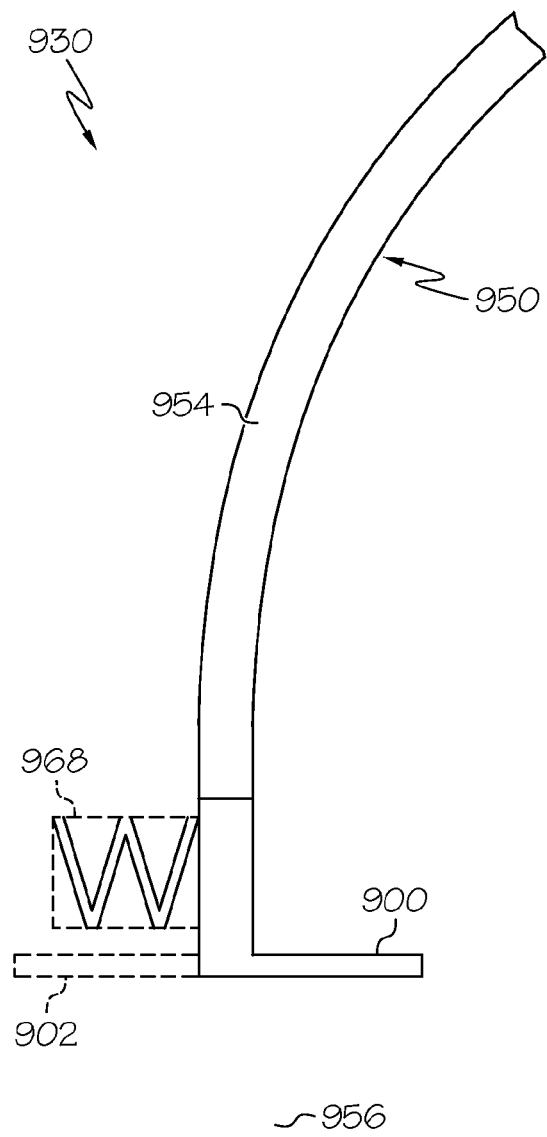
FIG. 9 is a partial cross-sectional view of a fuel injector shroud in accordance with an alternate exemplary embodiment.

FIG. 9 is a partial cross-sectional view of a fuel injector shroud 930 in accordance with an alternate exemplary embodiment. Unless otherwise noted, the fuel injector shroud 930 may have similar features to the fuel injector shroud 330 discussed above.

FIG. 9 particularly depicts a portion of one side of the body portion 950 of the fuel injector shroud 930, including a portion of the cylindrical section 952, dome section 954, and air inlet 956. As above, the air inlet 956 extends through the cylindrical section 952. In this exemplary embodiment, the air inlet 956 includes a flange or bell mouth 900 on one or both of the radial sides of the air inlet 956, extending in an axial direction into the fuel injector shroud 930. The bell mouth 900 may be arranged and sized to direct the desired amount of air into the fuel injector shroud 930.

In addition, or in the alternative, an additional flange or bell mouth 902, indicated in dashed lines, may be provided on one or both of the radial sides of the air inlet 956, extending away from the air inlet 956. Similar to bell mouth 900, the bell mouth 902 may be arranged and sized to direct the desired amount of air into the fuel injector shroud 930. Although the bell mouth 900 and bell mouth 902 are straight in the axial direction, the bell mouth 900 and bell mouth 902 may be contoured as necessary or desired. The bell mouth 900 and/or bell mouth 902 may, in effect, extend the length of the air inlet 956 to improve the flow coefficient (Cd). Improved flow through the air inlet 956 may enable a smaller air inlet and/or a smaller diameter shroud with the corresponding lower weight and stress.

The exemplary embodiment of FIG. 9 additionally includes an outer mounting ring 968 for mounting the fuel injector shroud 930 to the combustor liner (not shown). In this exemplary embodiment, the outer mounting ring 968 includes a bellows or corrugated structure. As such, the outer mounting ring 968 is at least partially flexible, particularly in the axial-circumferential plane. Accordingly, the outer mounting ring 968 may accommodate relative movement between the fuel injector shroud 930 and the combustor liner resulting, for example, from different temperatures, different rates of thermal expansion, and relative movement of the various components coupled to the combustor liner and fuel injector shroud 930. In effect, the flexible outer mounting ring 968 may absorb some of the load resulting from thermal differences instead of transferring load to the fuel injector shroud 930, thereby enhancing load bearing capacity of the fuel injector shroud 930 without the need for separate combustor support pins or increased shroud size. Additionally, as a result of this more compliant sealing arrangement, leaks between the fuel injector shroud 930 and combustor liner may be mitigated or eliminated.

Figure 10:
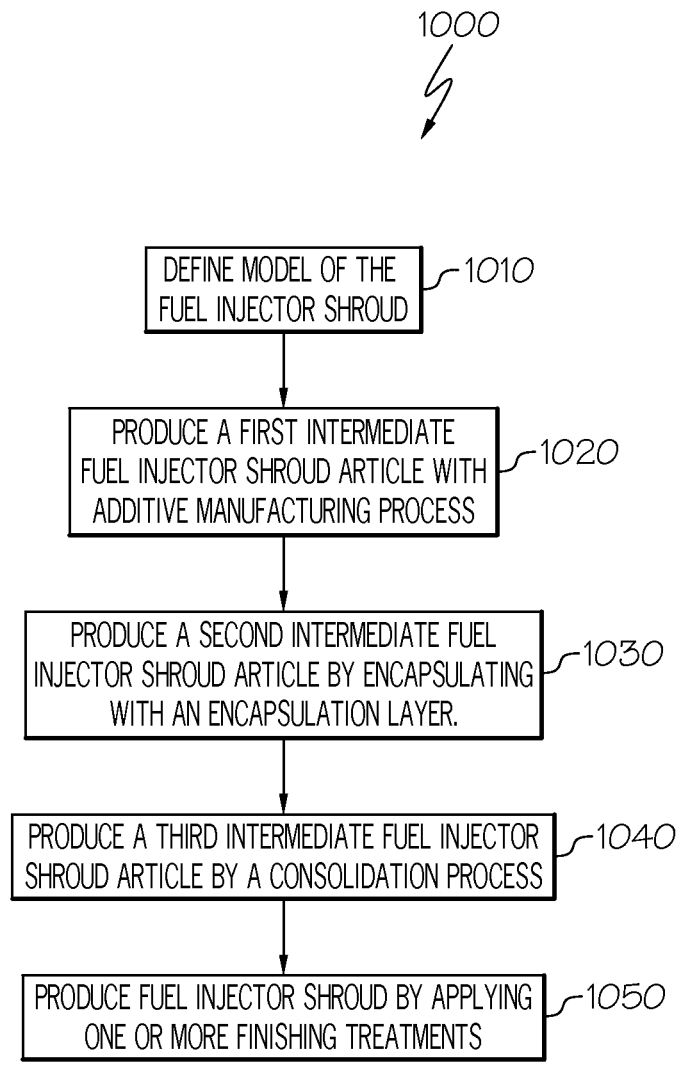
FIG. 10 is a flow chart depicting a method of manufacturing a fuel injector shroud in accordance with an exemplary embodiment.

FIG. 10 is a flow chart depicting a method 1000 of manufacturing a fuel injector shroud (e.g., fuel injector shroud 330, 930) in accordance with an exemplary embodiment. In general, the fuel injector shroud is manufactured as a unitary structure. The term "unitary" is used in this application to denote that the associated component is made as a single piece during manufacturing. Thus, a unitary component has a monolithic construction for the entire component, and is different from a component that has been made from a plurality of component pieces that have been joined together to form a single component. In other embodiments, portions of the fuel injector shroud, such as the swirler device, may be manufactured separately and welded or brazed into the other components of the fuel injector shroud.

In a first step 1010, a model, such as a design model, of the fuel injector shroud may be defined in any suitable manner. For example, the model may be designed with computer aided design (CAD) software. The model may include 3D numeric coordinates of the entire configuration of the component including both external and internal surfaces of an fuel injector shroud, as well as any internal channels and openings. In one exemplary embodiment, the model may include a number of successive 2D cross-sectional slices that together form the 3D component.

In a second step 1020, a first intermediate fuel injector shroud article is produced according to the model of step 1010 using a rapid prototyping or additive layer manufacturing process. Additive manufacturing (AM) processes fabricate components having relatively complex three dimensional geometries, including components with internal surfaces defining internal passages including internal hollow areas, internal channels, internal openings or the like for cooling, weight reduction, or otherwise. Additive Manufacturing (AM) is defined by the American Society for Testing and Materials (ASTM) as the "process of joining materials to make objects from 3D model data, usually layer upon layer, as opposed to subtractive manufacturing methodologies, such as traditional machining and casting." Some examples of additive layer manufacturing processes include:

micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques.

In one particular exemplary embodiment, direct metal laser sintering (or fusing) (DMLS/DMLF) is used to produce the first intermediate fuel injector shroud article. DMLS is a commercially available laser-based rapid prototyping and tooling process by which complex parts may be directly produced by precision melting and solidification of metal powder into successive layers of larger structures, each layer corresponding to a cross-sectional layer of the 3D component. For example, the first intermediate fuel injector shroud article may be formed within a build device containing powdered build material such that individual layers are formed by a laser fusing, subsequently lowered on a vertical device, additional build material is deposited on the previously formed layer, the subsequent layer is formed, and the process is repeated until the first intermediate fuel injector shroud article is completed. Any suitable laser and laser parameters may be used, including considerations with respect to power, laser beam spot size, and scanning velocity. The build material may be formed by any suitable powder, including metal powders, such as a stainless steel powder, and alloys and super alloy materials, such as nickel-based or cobalt superalloys. In one exemplary embodiment, the build material is a high temperature nickel base super alloy such as MAR-M-247. In other embodiments, IN718 or IN738 or other suitable alloys may be employed. The powder build material may be selected for enhanced strength, durability, and useful life, particularly at high temperatures.

In a subsequent optional step 1030, a second intermediate fuel injector shroud article is produced by encapsulating the first intermediate fuel injector shroud article with an encapsulation layer. The encapsulation layer may functions to effectively convert any surface porosity and cracks into internal porosity and cracks. Any suitable encapsulation process may be provided that bridges and covers the porosity and cracks in the surface. For example, the encapsulation layer may have a thickness of approximately 10-100 μm, although any suitable thickness may be provided. In one exemplary embodiment, the encapsulation layer may be a metal or alloy that is compatible with the substrate and may be applied by a plating or coating process.

In a further optional step 1040, a third intermediate fuel injector shroud article is produced by a consolidation process, such as a hot isostatic pressing (HIP) process in which the second intermediate fuel injector shroud article is subjected to elevated temperatures and pressures over time. The HIP process may be performed at any temperature, pressure, and time that are suitable for forming a compacted solid having negligible porosity. In one embodiment, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be smaller or larger.

In a further step 1050, the fuel injector shroud is produced by applying one or more finishing treatments to the third intermediate fuel injector shroud article. The finishing treatments may include, for example, additional heat, aging, annealing, quenching, or surface treatments. An additional finishing step 1050 may include machining, including machining to the final specifications and/or formation of cooling holes. In some embodiments, the cooling holes and other aspects that are typically formed by machining may be directly formed in the additive manufacturing process described above. At this point, the fuel injector shroud corresponds to the completed fuel injector shroud and may be positioned for its intended use, such as installed in the combustor of FIG. 2.

Accordingly, improved fuel injector assemblies, fuel injector shrouds, and methods of manufacturing a fuel injector shroud have been described. The exemplary embodiments discussed above may provide a more environmentally efficient, relatively simple, cost effective, and durable gas turbine combustion system design. In some exemplary embodiments, the improvements described above may mitigate or eliminate the need for thermal barrier coatings (TBC) for the fuel injector shrouds. Embodiments discussed herein may find beneficial use in many industries and applications, including aerospace, automotive, and electricity generation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fuel injector assembly, comprising:
   a fuel injector comprising a body and a nozzle coupled to the body, the body configured to deliver a flow of fuel to the nozzle; and
   a fuel injector shroud housing the fuel injector, the fuel injector shroud comprising
      a swirler device defining a center opening proximate to the nozzle of the fuel injector and a plurality of swirler holes surrounding the center opening,
      a body section comprising an air inlet configured to admit a flow of air into the fuel injector shroud and a dome section, wherein the dome section defines a mount for securing the swirler device to the body section, and
      at least one interior rib positioned on an interior surface of the dome section configured to direct the flow of air to the swirler holes of the swirler device such that the flow of air exiting through the swirler device through the swirler holes is mixed with the flow of fuel exiting the nozzle,
   wherein the at least one interior rib is a first interior rib of a plurality of interior ribs, and wherein each of the plurality of interior ribs has an end positioned in between adjacent swirler holes, and
   wherein each of the plurality of interior ribs extends from, and is integral with, the dome section.

2. The fuel injector assembly of claim 1, wherein each of the plurality of interior ribs follows an interior contour of the dome section.

3. The fuel injector assembly of claim 1, wherein the fuel injector shroud further includes at least one cooling hole extending through the at least one interior rib and the dome section.

4. The fuel injector assembly of claim 1, wherein the fuel injector shroud includes a bell mouth at the air inlet.

5. The fuel injector assembly of claim 1, wherein the fuel injector shroud includes a flange extending in a generally axial direction on a radial side of the air inlet.

6. The fuel injector assembly of claim 5, wherein the flange extends in the generally axial direction into the fuel injector shroud.

7. The fuel injector assembly of claim 5, wherein the flange extends in the generally axial direction away from the fuel injector shroud.

8. The fuel injection assembly of claim 1, wherein the plurality of interior ribs is configured to evenly distribute the flow of air into the plurality of swirler holes.

9. The fuel injection assembly of claim 1, wherein the fuel injector shroud further comprises a body portion with a mounting flange for mounting the fuel injector shroud and a cylindrical section extending from the mounting flange, the dome section extending from the cylindrical section,
wherein the end of the first interior rib positioned in between adjacent swirler holes is a first end, and wherein the first interior rib has a second end positioned on the cylindrical section such that the first rib extends from the second end on the cylindrical section, along the concave length of the dome section generally in the direction of air flow to the first end, proximate to the swirler device.

10. A fuel injector shroud for a fuel injector assembly, comprising:
a swirler device defining a center opening and a plurality of swirler holes surrounding the center opening, each of the plurality of swirler holes extending through the swirler device between an inlet and an outlet;
a body section comprising an air net configured to admit a flow of air into the fuel injector shroud and a dome section, wherein the dome section defines a mount for securing the swirler device to the body section;
at least one interior rib extending from an interior surface of the dome section configured to direct the flow of air to the inlets of the swirler holes of the swirler device; and
wherein the at least one interior rib is a first interior rib of a plurality of interior ribs, and wherein each of the plurality of interior ribs has an end positioned in between adjacent swirler holes.

11. The fuel injector shroud of claim 10, wherein at least one interior rib of the plurality of interior ribs is integral with the dome section.

12. The fuel injector shroud of claim 10, wherein at least one interior rib of the plurality of interior ribs follows an interior contour of the dome section.

13. The fuel injector shroud of claim 10, wherein the fuel injector shroud further includes at least one cooling hole extending through at least one interior rib of the plurality of interior ribs and the dome section.

14. The fuel injector shroud of claim 10, wherein the fuel injector shroud includes a bell mouth at the air inlet.

15. The fuel injector shroud of claim 10, further comprising a bellows mounting ring configured to couple the body section to a combustor liner.

16. A method for manufacturing a fuel injector shroud, comprising the steps of: defining a design model of the fuel injector shroud; and using additive manufacturing to form the fuel injector shroud as a unitary piece, including forming:
a swirler device defining a center opening and a plurality of swirler holes surrounding the center opening, each of the plurality of swirler holes extending through the swirler device between an inlet and an outlet;
a body section comprising an air inlet configured to admit a flow of air into the fuel injector shroud and a dome section, wherein the dome section defines a mount for securing the swirler device to the body section;
at least one interior rib extending from an interior surface of the dome section configured to direct the flow of air to the inlets of the swirler holes of the swirler device; and
wherein the at least one interior rib is a first interior rib of a plurality of interior ribs, and wherein each of the plurality of interior ribs has an end positioned in between adjacent swirler holes.

17. The method of claim 16, wherein the using step includes using direct metal laser fusing as the additive manufacturing.

* * * * *